June 19, 1923.
J. C. McCOMAS
SHIPPING DECK
Filed July 26, 1920
1,459,511
3 Sheets-Sheet 2
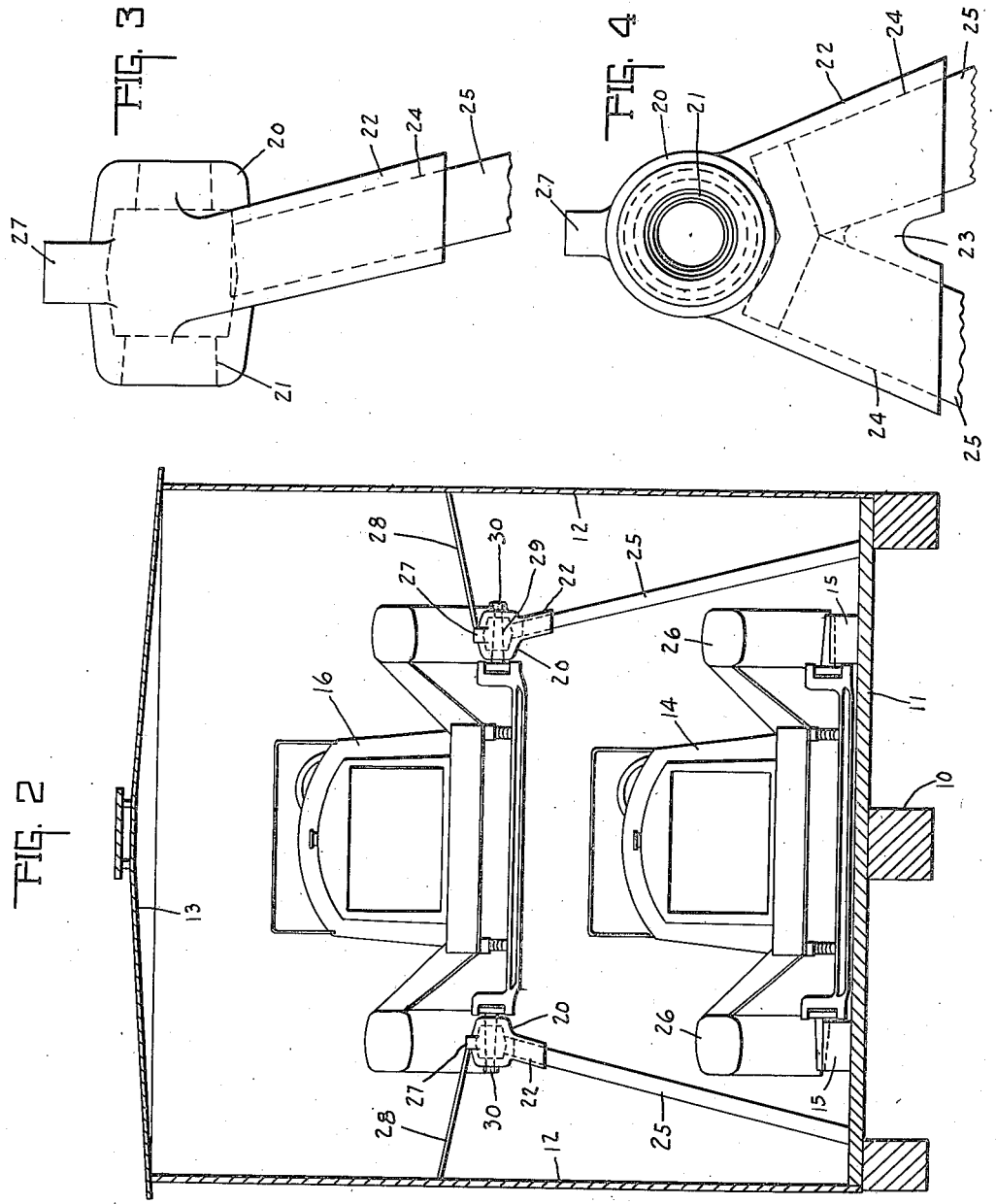
INVENTOR.
JESSE C. McCOMAS.
BY
*Lockwood & Lockwood*
ATTORNEYS

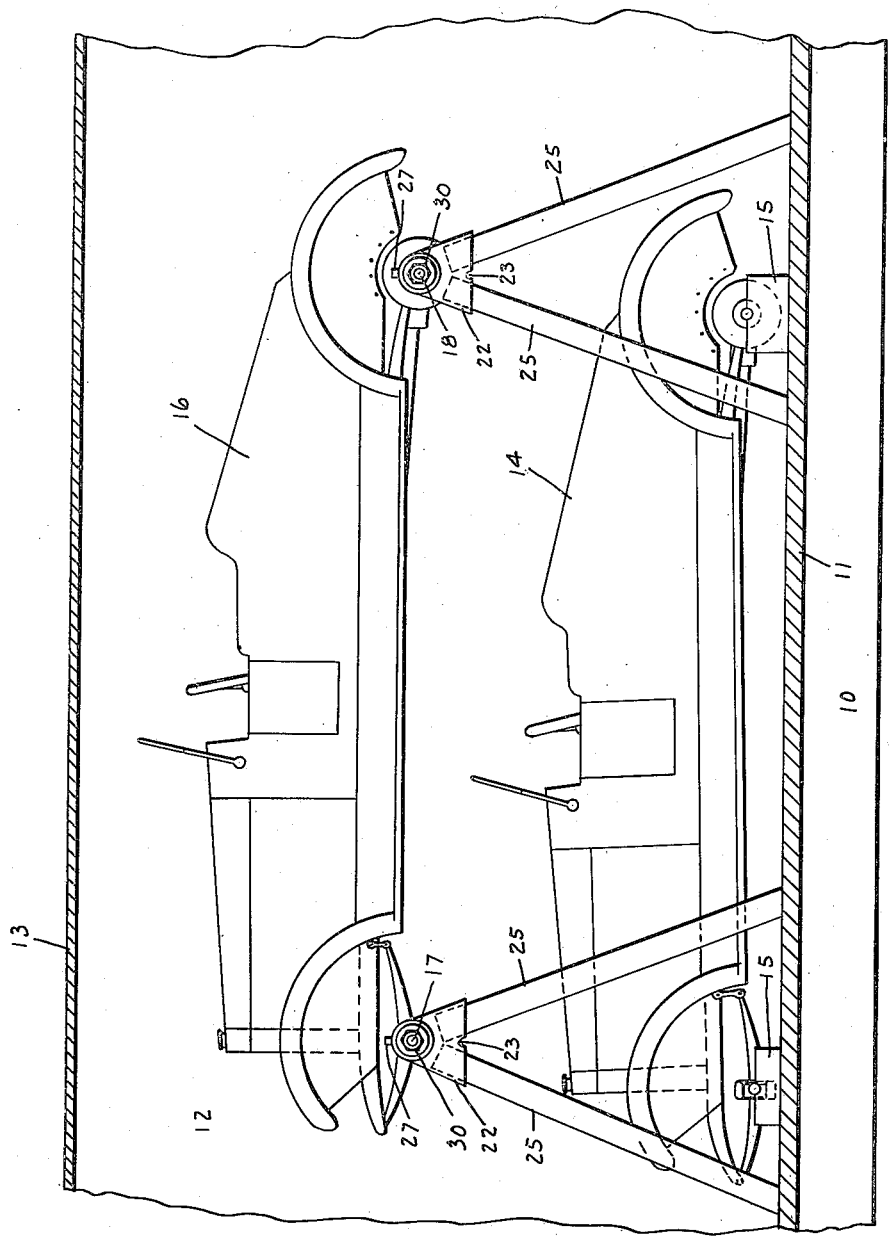

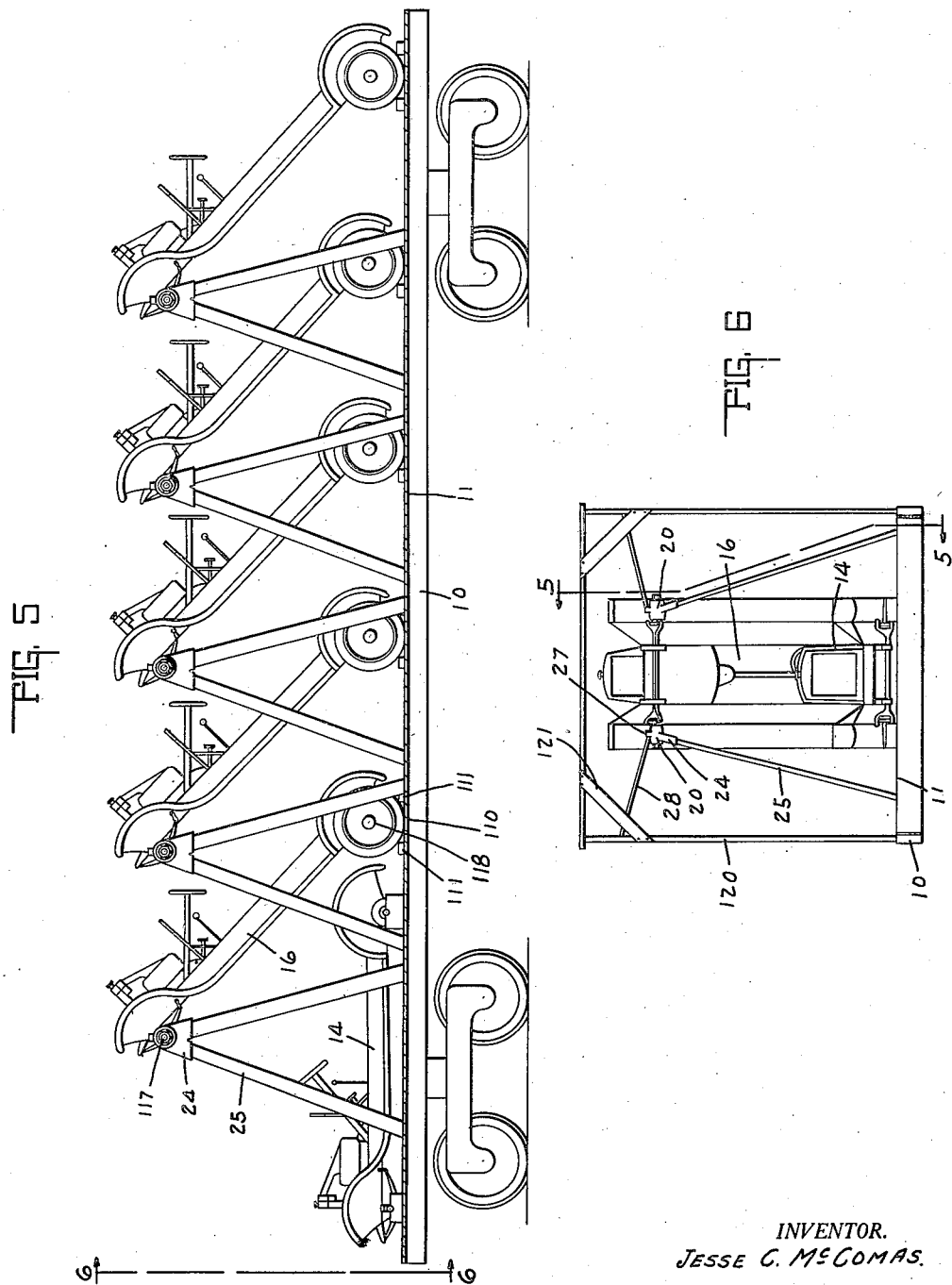

Patented June 19, 1923.

1,459,511

UNITED STATES PATENT OFFICE.

JESSE C. McCOMAS, OF INDIANAPOLIS, INDIANA.

SHIPPING DECK.

Application filed July 26, 1920. Serial No. 399,009.

*To all whom it may concern:*

Be it known that I, JESSE C. McCOMAS, a citizen of the United States, and a resident of Indianapolis, county of Marion, and State of Indiana, have invented a certain new and useful Shipping Deck; and I do hereby declare that the following is a full, clear, and exact description thereof, reference being had to the accompanying drawings, in which like numerals refer to like parts.

This invention relates to means for supporting vehicles within railroad cars or upon the same. The chief object of this invention is to provide improved means for supporting within a box car or the like one vehicle above the other such that the superposed vehicle is supported substantially as if the same were supported upon the car floor.

The chief feature of the invention consists in associating with the vehicle axle means for supporting said axle in spaced relation from the car floor and in spaced relation from the car sides, whereby said vehicle will be rigidly supported within the car.

One feature of the invention consists in a supporting and bracing member associated with the axle, by means of which the axle is supported upon the car floor and in spaced relation therewith and is also supported in spaced relation with the car side wall.

Another feature of the invention consists in so constructing the axle supporting means such that the same with equal facility may be associated with cars of various widths and various lengths.

The full nature of this invention will be understood from the accompanying drawings and the following description and claims.

In the drawings Fig. 1 is a side elevational view of the vehicle to which the invention has been applied and a longitudinal sectional view of the car supporting and enclosing the vehicle. Fig. 2 is an elevational front view of a vehicle to which the invention has been applied and a transverse cross sectional view of the supporting and enclosing car. Fig. 3 is an enlarged front view of a portion of the invention. Fig. 4 is an enlarged side elevational view of the same portion of the invention. Fig. 5 is a side elevational view of a flat car upon which the vehicles are supported by the invention, said view being taken on the line 5—5 of Fig. 6 and in the direction of the arrows. Fig. 6 is an end elevational view of the same taken on the line 6—6 of Fig. 5 in the direction of the arrows.

In the drawings 10 indicates the supporting car frame provided with a car bottom or flooring 11, side walls 12, and top 13. Upon the floor 11 is supported a vehicle 14. Said vehicle is supported by means of block and bracing brackets 15 which are associated with the axles of the vehicle. In the present instance the vehicle supported upon the floor, and to which this invention is particularly adapted, is a motor vehicle.

Heretofore, due to shortage of freight cars and also to save freight charges, the vehicles have been secured within the freight car by constructing a deck above the vehicle 14 upon which was supported another vehicle 16 in superposed relation to the vehicle 14. This deck, as constructed, was formed of wood, or other suitable material and in reality constituted an additional car bottom upon which the vehicle 16 was supported. After the vehicle 16 was removed from the car the deck was dismantled and served no further purpose.

This invention is constructed to support the vehicle 16 in superposed relation to the vehicle 14 within the freight car such that the supporting means or shipping deck formed by the invention may be very cheaply constructed, yet be equally as strong as the auxiliary floor or deck heretofore employed and simultaneously secure the superposed vehicle rigidly within the car. The shipping deck as constructed requires a minimum number of parts and is adapted to substantially all forms of motor vehicles as well as to be used repeatedly. With the invention the several elements associated with the axles are substantially similar which further reduces the cost of the same.

The invention in detail consists in associating with the front and rear axles 17 and 18 respectively of the superposed vehicle 16, suitable supporting and bracing means. As illustrated in Figs. 1 and 2 a supporting and bracing means is associated with each of the wheel supporting portions of the front and rear axles. It will, of course, be understood that the wheels are removed from the vehicle body and the invention is applied to the wheel supporting portion of said axles. In its simplest form the shipping deck consists of a wheel supporting axle engaging member which is supported from the car bottom or floor 11 by suitable supporting means and is braced against lateral movement towards the side wall 12 of the car by means of lateral bracing. It will be understood that to support the vehicle such that the same will be rigid within the car, means must be provided for bracing the vehicle to prevent lateral movement of the car, as well as longitudinal movement therein, and also support said vehicle in superposed relation to the vehicle beneath. In the present instance the means for supporting the vehicle and for preventing longitudinal movement of the vehicle is the same means. The dual function means in addition thereto assists in bracing the vehicle against lateral movement as well as longitudinal movement. In addition to the before mentioned means, additional transverse bracing means is provided.

Since the means embodying the invention which is associated with each of the wheel supporting axles and in the present invention with the spindles thereof, is substantially similar, a description of one will suffice for an understanding of them all. Reference will be had in particular to Figs. 3 and 4 wherein the invention is illustrated as comprising a body portion 20 which constitutes a hub member, said hub member being suitably tapered at 21 to receive the usual tapered spindle portion of each end of the axle of the vehicle. In the present embodiment of the invention there is illustrated a depending socket portion 22 which is illustrated as bifurcated at 23 to form two receiving recesses 24, each of which is adapted to receive a supporting member or standard 25. As illustrated clearly in Figs. 3 and 4 the depending socket receiving portion 22 extends angularly with respect to a plane transverse to the hub axis. This angularity, as illustrated clearly in Fig. 2, permits the standards 25 to clear the mud guards and fenders 26 of the lower vehicle 14. Since the usual freight car is adapted to receive a plurality of vehicles in tandem relation, longitudinal bracing means must be provided for each vehicle. When a plurality of vehicles are positioned in tandem relation it is exceedingly difficult to brace the same against longitudinal movement if the usual deck is not constructed. In the present invention, therefore, the bifurcated socket 23, when associated with a plurality of standards 25, constitutes an A-frame, as illustrated in Fig. 1 which supports each free end of the vehicle axle. When said A-frame construction is positioned within the car, by being suitably secured to the car bottom or floor 11 by being toenailed or otherwise blocked or bolted thereto, it will be understood that the vehicle 16 is supported in superposed relation upon the vehicle 14 and is prevented from moving longitudinally within the car. As illustrated clearly in Fig. 2, the angularity of the socket receiving portion 22 with respect to a plane transverse to the hub axis also prevents transverse movement of the vehicle. To insure that there will be no transverse movement of the superposed vehicle, the hub member is provided with a stop or rest portion 27 against which one end of the transverse side or lateral bracing member 28 is adapted to bear and rest. The other end of the lateral bracing member 28 is toenailed to the side wall 12 of the car, or otherwise blocked or bolted thereto, to rigidly secure the same. The side braces 28 also prevents overturning of the vehicle, since they are positioned above the plane of the hub axis. The hub member 20 is secured upon the spindle portion 29 by means of a nut 30.

From the foregoing construction it will be understood that the superposed vehicle is not only supported in superposed relation above the vehicle 14, but is prevented from turning over as well as prevented from moving longitudinally or transversely of the car.

The present embodiment of the invention, as shown clearly in the drawings, permits suitable supporting standards to be inserted into the receiving sockets 24 and suitable side bracing members 28 to be associated with the stop member. This arrangement permits the supporting and bracing hub, which preferably is integrally formed, to be used repeatedly by replacing or renewing the standards 25 and the braces 28 whenever the same become unfit for use.

In Figs. 5 and 6 the invention is shown applied to vehicles which are supported upon a flat car. In this instance one vehicle or running gear thereof, may be positioned on the car floor and secured thereto in the usual manner. The other vehicles are positioned in superposed relation and in this instance tilted, see vehicle 16 Fig. 5. The wheels 110 on the lower axle 118 of the tilted vehicles are retained and suitably blocked as at 111. The upper axles 117 are supported by the A-frame construction in the usual manner. A skeleton frame 120 suitably braced at 121 is positioned adjacent each superposed supported axle 117. To the same is secured the bracing members 28 while the floor 11 secures the standards 25 in the usual manner.

While the invention has been described in great detail in the foregoing specifications, it will be understood that many modifications thereof will suggest themselves to those skilled in the art, and these modifications are to be considered within the broad purview of this invention, which is to simplify the means for stationarily supporting a vehicle to prevent movement thereof.

The invention claimed is:

1. A unitary vehicle supporting member comprising a body portion providing a hub for replacing the vehicle wheel and receiving the vehicle supporting member thereof, means secured to said body portion for transverse bracing purposes, and integral socket means adapted to receive supporting standard means.

2. A unitary vehicle supporting member comprising a body portion providing a hub for replacing the vehicle wheel and receiving the vehicle supporting member thereof, means secured to said body portion for transverse bracing purposes, and socket means depending from said body portion and integral therewith and in angular relation to the hub axis, said socket means being adapted to receive the supporting standard means.

3. A unitary vehicle supporting member comprising a body portion providing a hub for replacing the vehicle wheel and receiving the vehicle supporting member thereof, means secured to said body portion for transverse bracing purposes, and a depending bifurcated portion integral with the body portion and provided with a recess in each bifurcation, each recess being adapted to receive a supporting standard, receiving and supporting said standards in angular relation to each other.

4. A unitary vehicle supporting member comprising a body portion providing a hub for replacing the vehicle wheel and receiving the vehicle supporting member thereof, means secured to said body portion for transverse bracing purposes, an integral bifurcated portion depending from said body frame hub in angular relation thereto and provided with a recess in each bifurcation, said recess being adapted to receive a supporting standard whereby said standards will be in angular relation to each other and to the hub axis.

5. A unitary vehicle supporting member comprising a body portion providing a hub for replacing the vehicle wheel and receiving the vehicle supporting member thereof, a stop member projecting upwardly from said body portion and integral therewith, and an integral bifurcated portion integral with said body portion and depending in angular relation to said hub axis, each bifurcation being recessed to receive a supporting member.

In witness whereof, I have hereunto affixed my signature.

JESSE C. McCOMAS.